US012598182B2

(12) United States Patent
Nambannor Kunnath et al.

(10) Patent No.: US 12,598,182 B2
(45) Date of Patent: Apr. 7, 2026

(54) PEER-TO-PEER SECURE MODE AUTHENTICATION

(71) Applicant: Omnissa, LLC, Mountain View, CA (US)

(72) Inventors: Ramanandan Nambannor Kunnath, Bangalore (IN); Rohit Pradeep Shetty, Bangalore (IN)

(73) Assignee: Omnissa, LLC, Mountain View, CA (US)

( * ) Notice: Subject to any disclaimer, the term of this patent is extended or adjusted under 35 U.S.C. 154(b) by 251 days.

(21) Appl. No.: 18/115,018

(22) Filed: Feb. 28, 2023

(65) Prior Publication Data

US 2024/0223561 A1      Jul. 4, 2024

(30) Foreign Application Priority Data

Jan. 4, 2023      (IN) .............................. 202341000556

(51) Int. Cl.
*H04L 9/40*          (2022.01)
*G06F 21/53*          (2013.01)

(52) U.S. Cl.
CPC .............. *H04L 63/10* (2013.01); *G06F 21/53* (2013.01); *H04L 63/083* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 11,922,074 B1 * | 3/2024 | Thomason | ............ | G06F 3/0655 |
| 2004/0168055 A1 * | 8/2004 | Lord | ..................... | H04L 9/3247 |
| | | | | 713/156 |

(Continued)

FOREIGN PATENT DOCUMENTS

| | | | | | |
|---|---|---|---|---|---|
| EP | 3553688 A1 * | 10/2019 | ........... | G06F 21/566 |
| WO | WO2007027361 A2 * | 3/2007 | ............... | G06F 9/44 |
| WO | WO-2008057653 A2 * | 5/2008 | ........... | H04L 67/104 |

OTHER PUBLICATIONS

Q. Li, H. Li, P. Russell, Z. Chen and C. Wang, "CA-P2P: context-aware proximity-based peer-to-peer wireless communications," in IEEE Communications Magazine, vol. 52, No. 6, pp. 32-41, Jun. 2014, doi: 10.1109/MCOM.2014.6829942. (Year: 2014).*

(Continued)

*Primary Examiner* — Paul R Fisher
(74) *Attorney, Agent, or Firm* — Kim & Stewart LLP

(57)          ABSTRACT

The present disclosure relates to peer-to-peer (P2P) secure mode authentication. A secondary client device can request access to an enterprise resource. The secondary client device can establish a P2P communication channel with a primary client device during a P2P secure mode. The secondary client device can determine a proximity of the computing device to the client device and generate proximity data based at least in part on the proximity of the computing device to the client device. The secondary client device can receive an authorization to access the enterprise resource based at least in part on the proximity data and access the enterprise resource by loading the enterprise resource within a sandboxed environment.

17 Claims, 4 Drawing Sheets

(56)     References Cited

U.S. PATENT DOCUMENTS

| | | | |
|---|---|---|---|
| 2010/0125643 A1* | 5/2010 | Gerber | H04L 12/66 |
| | | | 709/217 |
| 2012/0036564 A1* | 2/2012 | Gu | H04L 67/1046 |
| | | | 726/5 |
| 2014/0165158 A1* | 6/2014 | Chan | H04W 12/04 |
| | | | 726/4 |
| 2016/0050281 A1* | 2/2016 | Jain | H04L 67/141 |
| | | | 726/7 |
| 2019/0068617 A1* | 2/2019 | Coleman | H04L 63/0876 |
| 2020/0285752 A1* | 9/2020 | Wyatt | G06F 21/566 |

OTHER PUBLICATIONS

Marzal, S.; González-Medina, R.; Salas-Puente, R.; Figueres, E.; Garcera, G. A Novel Locality Algorithm and Peer-to-Peer Communication Infrastructure for Optimizing Network Performance in Smart Microgrids. Energies 2017, 10, 1275. (Year: 2017).*

\* cited by examiner

PEER-TO-PEER SECURE MODE AUTHENTICATION

RELATED APPLICATIONS

Benefit is claimed under 35 U.S.C. 119(a)-(d) to Foreign Application Serial No. 202341000556 filed in India entitled "PEER-TO-PEER SECURE MODE AUTHENTICA-TION", on Jan. 4, 2023, by VMware, Inc., which is herein incorporated in its entirety by reference for all purposes.

BACKGROUND

Multifactor authentication is widely used to verify end users. Multifactor authentication can involve using security questions or providing a one-time password to another device owned by a same user. Indeed, multifactor authentication often relies on a user having access to another of their devices at the time of authentication. These types of multifactor authentication schemes implicitly assume that the security of these other devices is not compromised.

BRIEF DESCRIPTION OF THE DRAWINGS

For a more complete understanding of the embodiments and the advantages thereof, reference is now made to the following description, in conjunction with the accompanying figures briefly described as follows.

DETAILED DESCRIPTION

The present disclosure relates to peer-to-peer (P2P) secure mode authentication. Current multifactor authentication schemes cannot verify whether a rogue attacker has intercepted a one-time password from a remote location or spoofed the device location to bypass geolocation failsafes. Yet users often have multiple devices in their close proximity at a given time.

P2P secure mode authentication can ensure that multifactor authentication occurs with close user proximity via a two-channel trust flow mechanism. The two-channel trust flow mechanism can ensure that the user is in close proximity to a device when a secure enterprise resource is accessed from that device. P2P secure mode authentication can therefore use a distance between an end user's primary device and the secondary device attempting to access the enterprise resource as a factor in authentication. A user can be granted access to the enterprise resource when the user's primary device is within close proximity to the secondary device. On the other hand, the user's access can be revoked when the primary device is too far from the secondary device.

Figure 1:
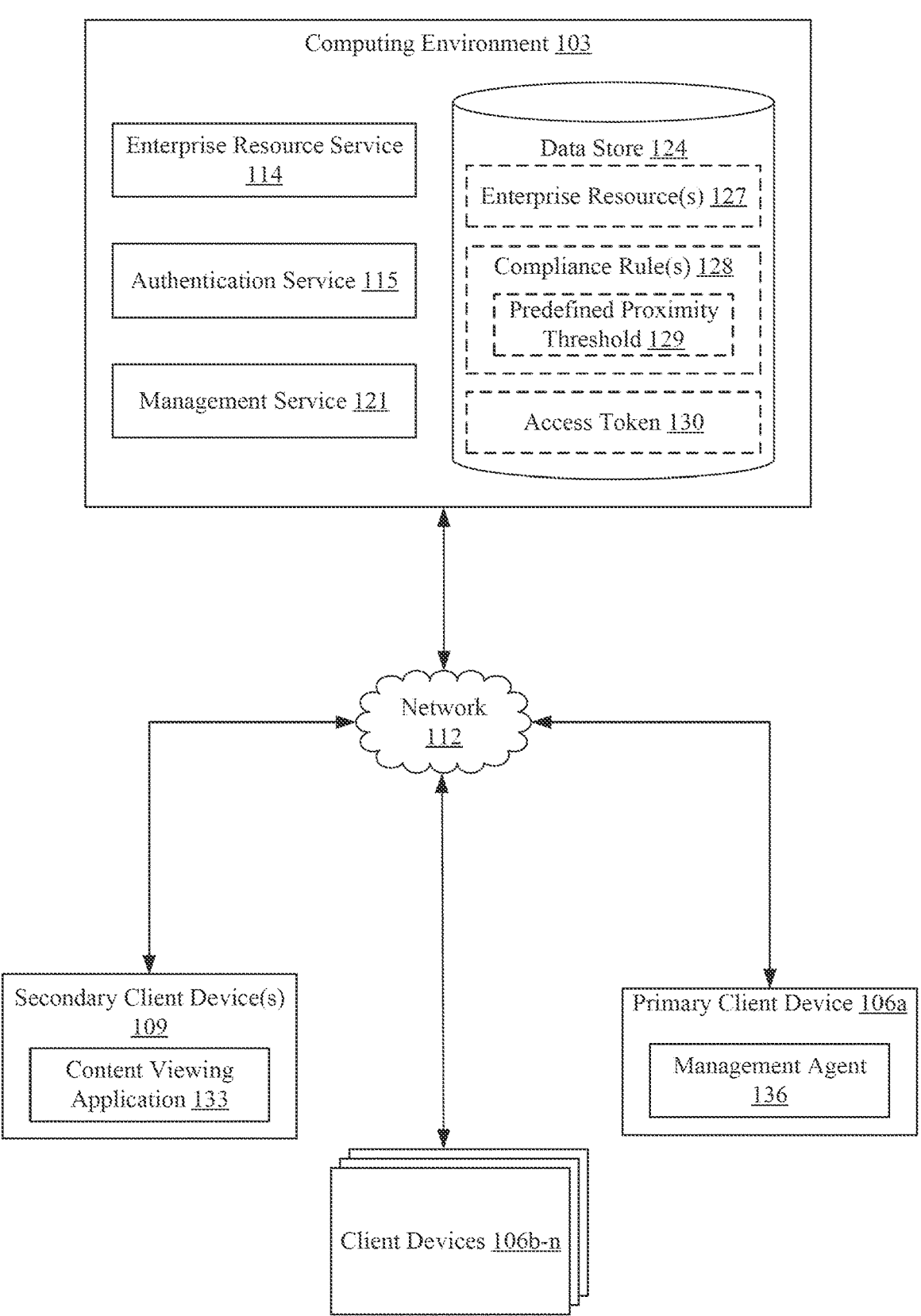
FIG. 1 shows an example of a networked environment 100 according to various embodiments of the present disclosure.

FIG. 1 shows an example of a networked environment 100 according to various embodiments. The networked environment 100 can include a computing environment 103, primary client device 106a, and one or more secondary client device(s) 109, in communication through a network 112.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks. The network 112 can include wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLU-ETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The computing environment 103 can be embodied as one or more computers, computing devices, or computing systems. In certain embodiments, the computing environment 103 can include one or more computing devices arranged, for example, in one or more servers or computer banks. The computing device or devices can be located at a single installation site or distributed among different geographical locations. The computing environment 103 can include a plurality of computing devices that together embody a hosted computing resource, a grid computing resource, or other distributed computing arrangement. In some cases, the computing environment 103 can be embodied as an elastic computing resource where an allotted capacity of processing, network, storage, or other computing-related resources vary over time. As further described below, the computing environment 103 can also be embodied, in part, as certain functional or logical (e.g., computer-readable instruction) elements or modules as described herein.

The computing environment 103 can operate as an environment for mobile device management or a Unified Endpoint Management (UEM) platform that can manage the primary client device 106a and secondary client device(s) 109. In that context, the computing environment 103 can execute an enterprise resource service 114, an authentication service 115, a management service 121, and potentially other applications. The computing environment 103 can also include a data store 124.

The data store 124 can include memory of the computing environment 103, mass storage resources of the computing environment 103, or any other storage resources on which data can be stored by the computing environment 103. The data store 124 can include one or more databases, such as a structured query language (SQL) database, a non-SQL database, or other appropriate database. The data stored in the data store 124, for example, can be associated with the operation of the various applications or functional entities described below. The data store 124 can include one or more enterprise resources 127 and potentially other data.

The enterprise resource service 114 can be executed to handle requests to access enterprise resources 127. For example, the enterprise resource service 114 can receive a request to access a particular enterprise resource 127 from the secondary client device 109. If authentication is required to access the enterprise resource 127, the enterprise resource service 114 can redirect the access request to the authentication service 115. And, if the enterprise resource 127 must be accessed using P2P secure mode, the enterprise resource 127 can notify the authentication service 115 of this fact. In some implementations, the enterprise resource service 114 can be notified by the authentication service 115 when a user of the secondary client device 109 has been successfully authenticated and been issued a valid access token 130. After the secondary client device 109 is issued a valid access token 130, the enterprise resource service 114 can grant the secondary client device 109 access to the enterprise resource 114, either in response to a request from the secondary client device 109 or automatically upon being notified of the access token 130. If the enterprise resource service 114 is notified by the authentication service 115 that the access token 130 has been revoked, however, the enterprise resource service 114 can revoke the secondary client device's 109 access to the enterprise resource 127.

The authentication service 115 can be executed to handle requests to access an enterprise resource 127 from a secondary client device 109. For example, a secondary client device's 109 request to access an enterprise resource 127 can be redirected by the enterprise resource service 114 to the authentication service 115. In addition, the authentication service 115 can also be notified that the enterprise resource 127 must be accessed in P2P secure mode. Before the authentication service 115 can then authenticate a user of the secondary client device 109 before the user is allowed to access the enterprise resource 127. The authentication service 115 can prompt the user of the secondary client device 109 to provide authentication credentials. If the authentication service 115 is unable to verify that the provided authentication credentials are authentic, the authentication service 115 can provide an error message to the secondary client device 109.

If the authentication service 115 successfully verifies the provided authentication credentials, then the authentication service 115 can request that the management service 121 initialize a P2P secure mode of the primary client device 106a. As discussed above, the authentication service 115 can have determined that the secondary client device 109 can only access the enterprise resource 127 while the primary client device 106a is in P2P secure mode.

The authentication service 115 can grant a user of the secondary client device 109 access to the enterprise resource 127 once an access token 130 is issued by the management service 121. As discussed further below, the access token 130 can represent the secondary client device's 109 authorization to access to the enterprise resource 127. The authentication service 115 can receive the access token 130 from the management service 121 once the management service 121 has determined that the secondary client device 109 is compliant the one or more compliance rules 128, including the predefined proximity threshold 129. In some implementations, the authentication service 115 can verify an integrity of the access token 130 before granting the secondary client device 109 access to the enterprise resource 127. The authentication service 115 can then grant the secondary client device 109 access to the enterprise resource 127. For example, the authentication service 115 can notify the enterprise resource service 114 that the secondary client device 109 is authorized to access the enterprise resource 127.

Likewise, the authentication service 115 can remove the user's access to the enterprise resource 127 on the secondary client device 109 when the access token 130 is revoked. For instance, the authentication service 115 can be notified by the management service 121 that the access token 130 has been revoked. The authentication service 115 can then, as an example, notify the enterprise resource service 114 that the secondary client device 109 is no longer authorized to access the enterprise resource 127. That way, the enterprise resource service 114 can remove the secondary client device's 109 access to the enterprise resource 127. If the secondary client device 109 is subsequently re-issued an access token 130, the authentication service 115 can verify the new access token 130 and notify the enterprise resource service 114 that the secondary client device 109 can again access the enterprise resource 127.

The management service 121 can be executed to administer the operation of primary client device 106a and secondary client device(s) 109 that are enrolled or otherwise registered with the management service 121. To this end, the management service 121 can also provide mechanisms for the primary client device 106a or a secondary client device 109 to enroll or otherwise register with the management service 121. The management can also install or cause to be installed various applications on the primary client device 106a or secondary client device 109 or for various configuration settings of the primary client device 106a or secondary client device 109 to be set to a specified value.

The management service 121 can receive a request for P2P secure mode initialization from the authentication service 115. The management service 121 can then generate a command to cause a primary client device 106a to enter P2P secure mode. During P2P secure mode, the secondary client device 109 and a primary client device 106a can communicate over a P2P channel between the two devices to gather data regarding a proximity of the secondary client device 109 to the primary client device 106a. The management service 121 can use this proximity data to determine whether the secondary client device 109 complies with the one or more compliance rules 128, including whether the proximity of the secondary client device 109 is within a predefined proximity threshold 129. Based on whether the secondary client device 109 is compliant, the management service 121 can generate (or not generate) an access token 130, which can grant the secondary client device 109 access to the enterprise resource 127.

The management service 121 can identify a primary client device 106a among the client devices 106b-n for P2P secure mode authentication. In some implementations, the management service 121 can identify a nearest "active" client device 106 as the primary client device 109. An active client device can be one that is currently and actively being used. The management service 121 can determine whether a client device 106 is active based on, for example, activity data from device data associated with that client device 106. The management service 121 can determine what active client device 106 is nearest to the secondary client device 109 based on, for example, geolocation data from device data associated with that client device 106.

In other implementations, the management service 121 can identify a client device 106 designated by a user of the secondary client device 109 as a primary client device 106a, if any. For example, the management service 121 can check device data corresponding to client devices 106 associated with that user to determine whether any of those client devices 106 have been designated. The management service 121 can designate one of the client devices 106 as a primary client device 106a in response to a designation request from the secondary client device 109. This designation request can include, as an example, an identifier for that client device 106.

The management service 121 can determine a compliance of the primary client device 106*a* and the secondary client device 109 with the one or more compliance rules 128. For example, the management service 121 can determine whether the secondary client device 109 is within a predefined proximity threshold 129 of the primary client device 106*a*. While in P2P secure mode, the primary client device 106*a* and the secondary client device 109 can provide proximity data to the management service 121. The proximity data can indicate a proximity of the secondary client device 109 to the primary client device 106*a*.

Using this proximity data, the management service 121 can determine whether the secondary device 109 is within the predefined proximity threshold 129 of the primary device 106. This predefined proximity threshold 129 can define a distance between the primary client device 106*a* and a secondary client device 109 within which the secondary client device 109 can be permitted to access the enterprise resource 127. If the proximity data indicates that the secondary client device 109 is outside of the predefined proximity threshold 129, however, the secondary client device 109 may not be permitted to access the enterprise resource 127. The management service 121 can receive proximity data continually while the primary client device 106*a* and secondary client device 109 are in P2P secure mode. Thus, the management service 121 can continually make determinations of whether the secondary client device 109 is within the proximity threshold 129 while the primary client device 106*a* is in P2P secure mode.

The management service 121 can generate an access token 130 for the secondary client device 109. The access token 130 can represent the secondary client device's 109 authorization to access to the enterprise resource 127. The access token 130 can include a character string, code, or other data. In some implementations, the access token 130 can be associated with a time limit such as 1 hour, 3 hours, 6 hours, 8 hours, or some other period of time. After expiration of the time limit, the access token 130 can no longer be used to prove the secondary client device's 109 authorization to access the enterprise resource 127.

The management service 121 can generate the access token 130 upon determining that the proximity of the secondary client device 109 is within the predefined proximity threshold 129 and otherwise compliant with the one or more compliance rules 128. The management service 121 can provide the access token 130 to the authentication service 115. On the other hand, if the management service 121 determines that the proximity of the secondary client device 109 meets or exceeds the predefined proximity threshold 129, then the management service 121 can refrain from generating the access token 130.

The management service 121 can revoke the access token 130 if the secondary client device 109 becomes non-compliant with the one or more compliance rules 128 while in the P2P secure mode. For example, the management service 121 can revoke the access token 130 if the secondary client device's 109 proximity to the primary client device 106*a* meets or exceeds the predefined threshold at any point during P2P secure mode. The management service 121 can notify the authentication service 115 that the access token 130 is no longer valid so that the authentication service 115 can ensure that the secondary client device's 109 access to the enterprise resource 127 is removed.

The enterprise resource(s) 127 can represent content associated with an enterprise. Enterprise resources 127 can include any electronic data associated with an enterprise, such as databases, applications, text files, word processor files, spreadsheet files, presentation files, graphic files, audio files, photographic files, video files, applications and application files, and/or the like.

The client devices 106*a-n* (collectively "client devices 106"), including the primary client device 106*a*, can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The primary client device 106*a* can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of a client device 106 or can be connected to the client device 106 through a wired or wireless connection. While the following discussion refers to the primary client device 106*a* in particular, it is understood that other client devices 106*b-n* may also perform the functionality disclosed below.

The primary client device 106*a* can be configured to execute various applications such as a management agent 136 and potentially other applications. The management agent 136 can be installed on the primary client device 106*a* to facilitate management of the primary client device 106*a* by the management service 121. The management agent 136 can be installed with elevated privileges or be effectuated through operating system APIs to manage the primary client device 106*a* on behalf of the management service 121. The management agent 136 can have the authority to manage data on the primary client device 106*a*; install, remove, or disable certain applications; or install configuration profiles, such as VPN certificates, Wi-Fi profiles, email profiles, or other profiles for configuring various functions or applications of the primary client device 106*a*.

The management agent 136 can cause the primary client device 109 to enter P2P secure mode. The management agent 136 can do so when the primary client device 106*a* receives a command to enter P2P secure mode from the management service 121. When the primary client device 106*a* enters P2P secure mode, the management agent 136 can communicate with the secondary client device 109 to gather proximity data for the secondary client device 109. The proximity data can allow the management service 121 to determine a distance between the primary client device 106*a* and the secondary client device 109. The management agent 136 can generate proximity data based on, for example, nearby Wi-Fi networks, Bluetooth, Bluetooth Low Energy, near-field communication, sound detection, or other suitable methods. The management agent 136 can continually transmit proximity data to the management service 121 while the primary client device 106*a* is in P2P secure mode. The primary client device 106*a* can remain in P2P secure mode until the secondary client device 109 exits P2P secure mode and/or indicates that the enterprise resource 127 is no longer being accessed, upon which the management agent 136 can cause the primary client device 106a to exit P2P secure mode.

The secondary client device(s) 109 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The secondary client device 109 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the secondary client device 109 or can be connected to the secondary client device 109 through a wired or wireless connection.

The secondary client device 109 can be configured to execute various applications such as a content viewing application 133 and potentially other applications. The content viewing application 133 can be executed to access network content served up by the computing environment 103 or other servers or computing devices, thereby rendering a user interface on a display. To this end, the content viewing application 133 can include a browser, a dedicated application, or other executable, and the user interface can include a network page, an application screen, or other user mechanism for obtaining user input. The secondary client device 109 can be configured to execute applications beyond the content viewing application 133 such as email applications, social networking applications, word processors, spreadsheets, or other applications.

The content viewing application 133 can request access to an enterprise resource 127. For instance, the content viewing application 133 can provide an access request for the enterprise resource 127 to the enterprise resource service 114. That access request can include, as an example, an identifier, a locator, or other identifying information regarding the enterprise resource 127. The access request can be redirected to the authentication service 115, which can begin an authentication process with the secondary client device 109.

The content viewing application 133 can authenticate with the authentication service 115 to verify an identify of a user of the secondary client device 109. After an access request for the enterprise resource 127 is redirected from the enterprise resource service 114, the content viewing application 133 can receive an authentication prompt from the authentication service 115. The content viewing application 133 can then prompt a user of the secondary client device 109 to provide the authentication credentials using, for example, a user interface rendered in a display of the secondary client device 109. The authentication credentials can include password, passphrase, authentication code or token, encryption key, or similar data used to verify an identity of the user. The content viewing application 133 can provide authentication credentials to the authentication service 115.

The content viewing application 133 can access the enterprise resource 127. For example, the content viewing application 133 generate a containerized sandbox environment that enforces restrictions established by the one or more compliance rules 128. The content viewing application 113 can restrict any outside processes or applications from accessing the enterprise resource 127 loaded within the sandboxed environment.

When the enterprise resource service 114 grants access to the enterprise resource 127 because the secondary client device 109 compliant with the one or more compliance rules 128, the content viewing application 133 can load the enterprise resource 127 within the sandboxed environment. The content viewing application 133 can then enable the user to access the enterprise resource 127 within the sandboxed environment. In some implementations, the content viewing application 133 can receive and execute a command from the enterprise resource service 114 that enables access to the enterprise resource 127 within the sandboxed environment.

Likewise, when the enterprise resource service 114 removes access to the enterprise resource 127 because the secondary client device 109 is non-compliant with the one or more compliance rules 128, the content viewing application 133 can restrict access to the enterprise resource 127 even though it is still loaded within the sandboxed environment. The content viewing application 133 can thereby prevent the user or any other application or process on the secondary client device 109 from accessing the enterprise resource 127, within or without the sandboxed environment. In some implementations, the content viewing application 133 can receive and execute a command from the enterprise resource service 114 that restricts access to the enterprise resource 127 within (or without) the sandboxed environment. The one or more compliance rules 128 can therefore be enforced by using the sandboxed container to access the enterprise resource 127.

Figure 2A:
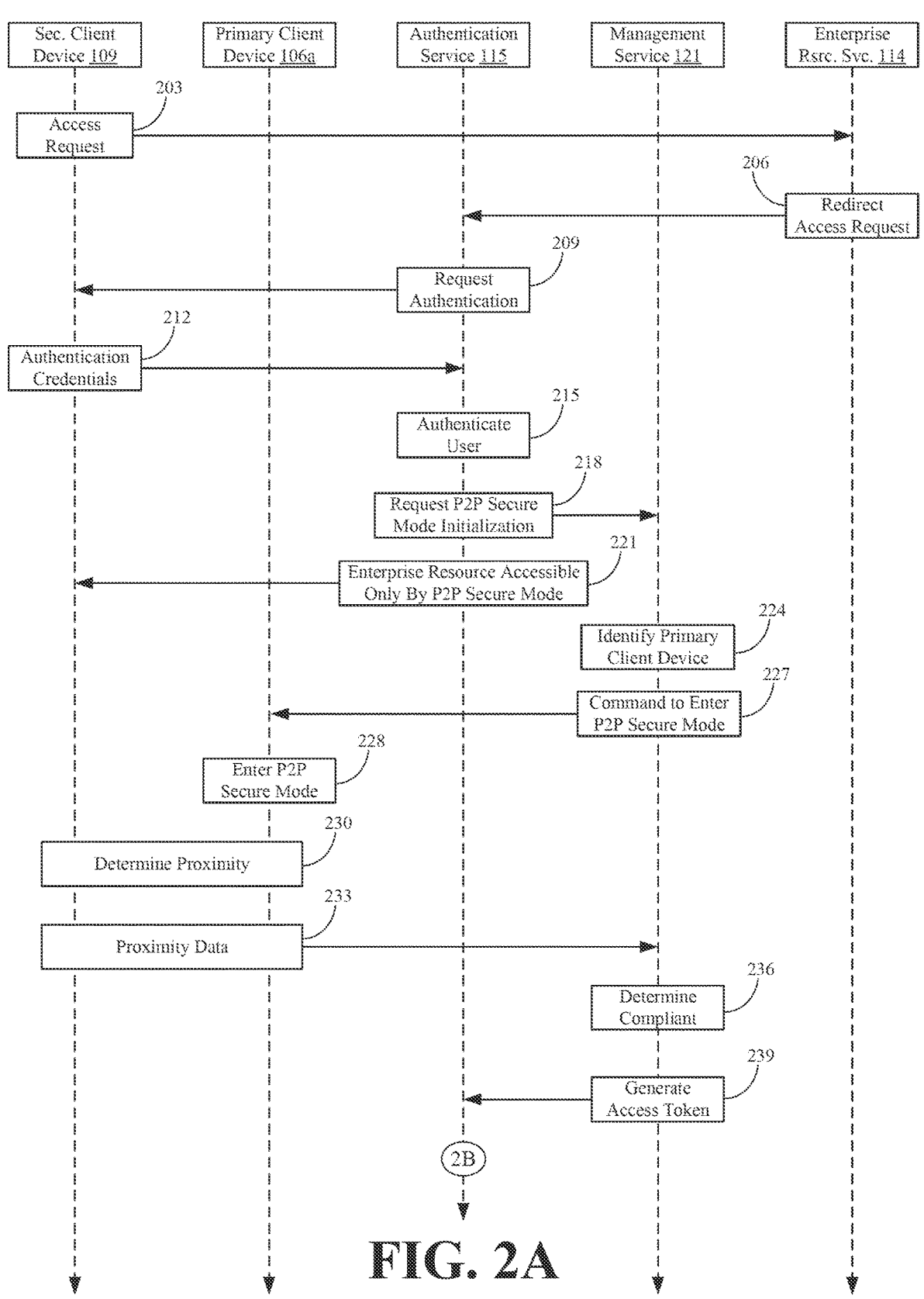
FIGS. 2A-B show sequence diagrams that provide examples of functionality implemented by components of the networked environment, according to various embodiments of the present disclosure.
Figure 2B:
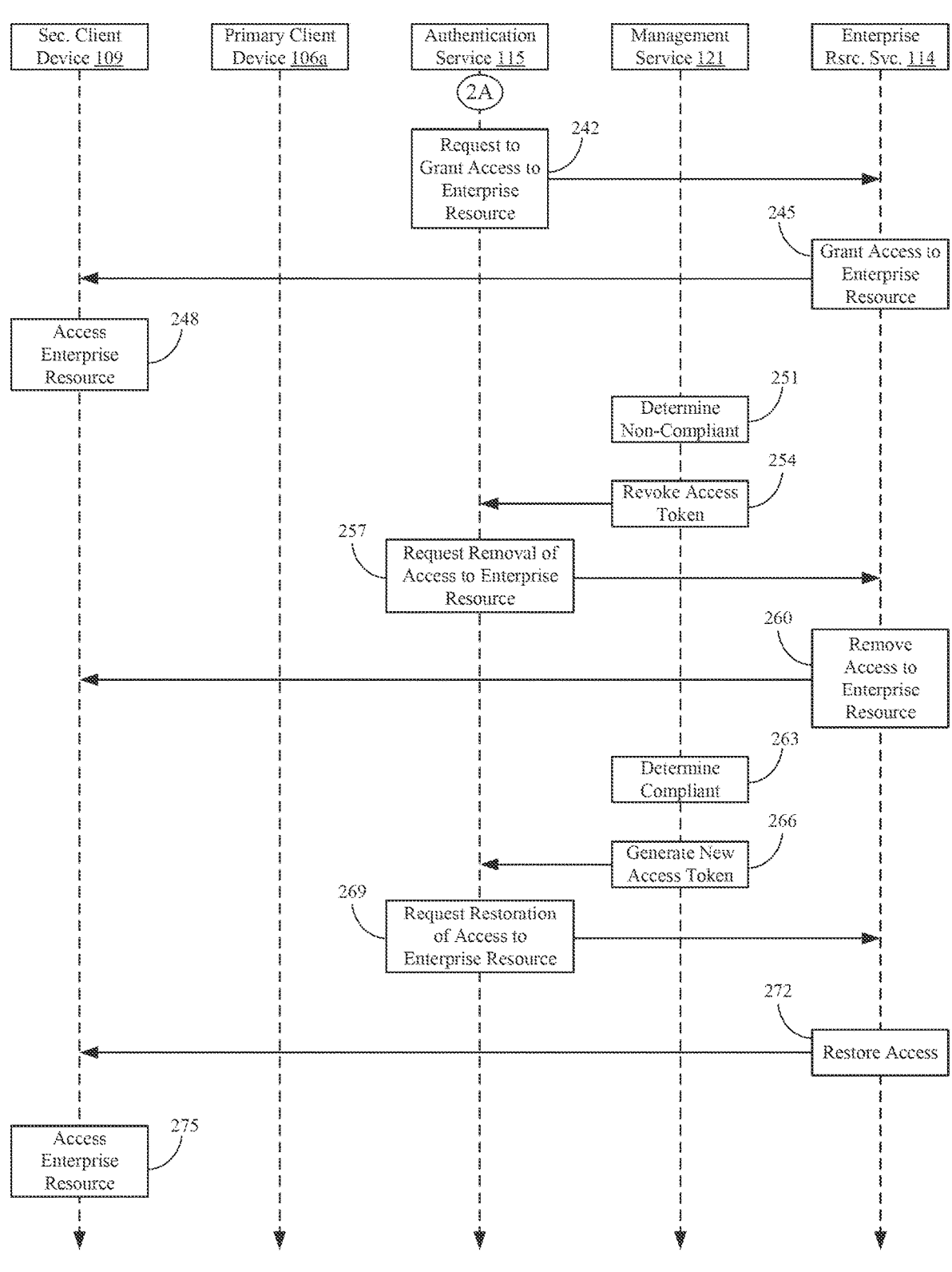

FIGS. 2A-B show sequence diagrams that provide examples of functionality implemented by components of the networked environment 100. It is understood that the sequence diagrams of FIGS. 2A-B provide merely an example of the many different types of functional arrangements that can be employed to implement the portions of the networked environment 100 as described herein. As an alternative, the sequence diagrams of FIGS. 2A-B can be viewed as depicting an example of elements of a method implemented within the networked environment 100.

Turning to FIG. 2A and step 203, the secondary client device 109 can provide an access request to the enterprise resource service 114. The secondary client 109 can request access to a particular the enterprise resource 127. For instance, the secondary client device 109 can provide an access request for the enterprise resource 127 to the enterprise resource service 114. That access request can include, as an example, an identifier, a locator, or other identifying information regarding the enterprise resource 127.

At step 206, the enterprise resource service 114 can redirect the access request to the authentication service 115. The enterprise resource service 114 can redirect the request if authentication is required to access the enterprise resource 127. The enterprise resource service 114 can redirect the access request so that the authentication service 115 can begin an authentication process with the secondary client device 109. In addition, the enterprise resource service 114 can determine that the enterprise resource 127 must be access in P2P secure mode and notify the authentication service 115 of that fact in the redirected access request.

At step 209, the authentication service 115 can request that a user of the secondary client device 109 authenticate with the authentication service 115. The authentication service 115 can authenticate the user of the secondary client device 109 before the user is allowed to access the enterprise resource 127. The authentication service 115 can therefore prompt the user of the secondary client device 109 to provide authentication credentials.

At step 212, the secondary client device 109 can provide authentication credentials to the authentication service 115. The secondary client device 109 can prompt a user of the secondary client device 109 to provide the authentication credentials using, for example, a user interface rendered in a display of the secondary client device 109. The authentication credentials can include password, passphrase, authentication code or token, encryption key, or similar data used to verify an identity of the user.

At step 215, the authentication service 115 can authenticate the user of the secondary client device 109. To authenticate the user, the authentication service 115 can verify that the authentication credentials received at step 212 are authentic.

At step 218, the authentication service 115 can request that the management service 121 initialize a P2P secure mode of the primary client device 106a. As discussed above, the authentication service 115 can have determined that the secondary client device 109 can only access the enterprise resource 127 while the primary client device 106a is in P2P secure mode.

At step 221, the authentication service 115 can notify the secondary client device 109 that the enterprise resource 127 is only accessible using P2P secure mode. P2P secure mode can involve the secondary client device 109 and a primary client device 106a gathering data regarding a proximity of the secondary client device 109 to the primary client device 106a, as discussed in detail below.

At step 224, the management service 121 can identify a primary client device 106a. The management service 121 can identify the primary client device 106a from among the client devices 106. The primary client device 106a can be identified for P2P secure mode authentication, which can allow the secondary client device 109 to access the enterprise resource 127. In some implementations, the management service 121 can identify a nearest "active" client device 106 as the primary client device 109. An active client device can be one that is currently and actively being used. The management service 121 can determine whether a client device 106 is active based on, for example, activity data from device data associated with that client device 106. The management service 121 can determine what active client device 106 is nearest to the secondary client device 109 based on, for example, geolocation data from device data associated with that client device 106. In other implementations, the management service 121 can identify a client device 106 designated by a user of the secondary client device 109 as a primary client device 106a, if any. For example, the management service 121 can check device data corresponding to client devices 106 associated with that user to determine whether any of those client devices 106 have been designated. The management service 121 can designate one of the client devices 106 as a primary client device 106a in response to a designation request from the secondary client device 109. This designation request can include, as an example, an identifier for that client device 106.

At step 227, the management service 121 can generate a command to cause the primary client device 106a identified at step 224 to enter P2P secure mode. During P2P secure mode, the secondary client device 109 and the primary client device 106a can communicate over a P2P channel to gather data regarding a proximity of the secondary client device

109 to the primary client device 106a. The management service 121 can provide the command to the primary client device 106a.

At step 228, the primary client device 106a can enter P2P secure mode upon receiving the command generated at step 227. To enter P2P secure mode, the primary client device 106a can establish a P2P channel between the primary client device 106a and the secondary client device 109. The primary client device 106a can then notify the secondary client device 109 that the primary client device 106a has entered P2P secure mode.

At step 230, the primary client device 106a and the secondary client device 109 can both determine a proximity of the secondary client device 109 to the primary client device 106a. The primary client device 106a and the secondary client device 109 can each make this determination based on proximity data generated during P2P secure mode by communicating with each other using a P2P channel. The primary client device 106a and the secondary client device 109 can generate proximity data based on, for example, nearby Wi-Fi networks, Bluetooth, Bluetooth Low Energy, near-field communication, sound detection, or other suitable methods. The primary client device 106a and the secondary client device 109 can continually At step 233, each of the primary client device 106a and the secondary client device 109 can provide the proximity data it generated at step 230 to the management service 121. Both the primary client device 106a and the secondary client device 109 can continually provide the proximity data to the management service 121 while the primary client device 106a remains in P2P secure mode.

At step 236, the management service 121 can determine a compliance of the primary client device 106a and the secondary client device 109 with the one or more compliance rules 128. For example, the management service 121 can determine whether the secondary client device 109 is within a predefined proximity threshold 129 of the primary client device 106a. While in P2P secure mode, the primary client device 106a and the secondary client device 109 can provide proximity data to the management service 121. The proximity data can indicate a proximity of the secondary client device 109 to the primary client device 106a. Using this proximity data, the management service 121 can determine whether the secondary device 109 is within the predefined proximity threshold 129 of the primary device 106. This predefined proximity threshold 129 can define a distance between the primary client device 106a and a secondary client device 109 within which the secondary client device 109 can be permitted to access the enterprise resource 127. If the proximity data indicates that the secondary client device 109 is outside of the predefined proximity threshold 129, however, the secondary client device 109 may not be permitted to access the enterprise resource 127. The management service 121 can receive proximity data continually while the primary client device 106a and secondary client device 109 are in P2P secure mode. Thus, the management service 121 can continually make determinations of whether the secondary client device 109 is within the proximity threshold 129 while the primary client device 106a is in P2P secure mode.

At step 239, the management service 121 can generate an access token 130 for the secondary client device 109. The access token 130 can represent the secondary client device's 109 authorization to access to the enterprise resource 127. The access token 130 can include a character string, code, or other data. In some implementations, the access token 130 can be associated with a time limit such as 1 hour, 3 hours, 6 hours, 8 hours, or some other period of time. After expiration of the time limit, the access token 130 can no longer be used to prove the secondary client device's 109 authorization to access the enterprise resource 127. The management service 121 can generate the access token 130 upon determining that the proximity of the secondary client device 109 is within the predefined proximity threshold 129 and otherwise compliant with the one or more compliance rules 128. The management service 121 can then provide the access token 130 to the authentication service 115. The process shown in FIG. 2A can then proceed into FIG. 2B.

Turning to FIG. 2B and step 242, the authentication service 115 can request that the enterprise resource service 114 grant the secondary client device 109 access to the enterprise resource 127. For example, the authentication service 115 can notify the enterprise resource service 114 that the secondary client device 109 has been issued the access token 130 and/or is authorized to access the enterprise resource 127.

At step 245, the enterprise resource service 114 can grant the secondary client device 109 access to the enterprise resource 127. For example, the enterprise resource service 114 can generate a command that, when executed by the secondary client device 109, would cause a sandboxed environment executing on the secondary client device 109 to enable a user of the secondary client device 109 to view, edit, or otherwise access the enterprise resource 127 within the sandboxed environment. As another example, the enterprise resource service 114 can instead notify the secondary client device 109 that the secondary client device 109 is now authorized to access the enterprise resource 127.

At step 248, the secondary client device 109 can access the enterprise resource 127. For example, the secondary client device 109 can load the enterprise resource 127 within the sandboxed environment. The secondary client device 109 can then enable the user to access the enterprise resource 127 within the sandboxed environment. In some implementations, the secondary client device 109 can receive and execute a command from the enterprise resource service 114 that enable access to the enterprise resource 127 within the sandboxed environment.

At step 251, the management service 121 can determine that the secondary client device 109 has become non-compliant with the one or more compliance rules 128. For example, the management service 121 determine that the secondary client device's 109 proximity to the primary client device 106a meets or exceeds the predefined threshold during P2P secure mode. The management service 121 can make this determination based on the proximity data continually provided to the management service 121 by the primary client device 106a and the secondary client device 109 during P2P secure mode.

At step 254, the management service 121 can revoke the access token 130. The management service 121 can revoke the access token 130 in response to determining that the secondary client device 109 has become non-compliant to the one or more compliance rules 128. The management service 121 can then notify the authentication service 115 that the access token 130 is no longer valid.

At step 257, the authentication service 115 can request that the enterprise resource service 114 remove the secondary client device's 109 access to the enterprise resource 127. In particular, the authentication service 115 can notify the enterprise resource service 114 that the access token 130 has been revoked and request that the enterprise resource service 114 cease permitting the secondary client device 109 to access the enterprise resource 127.

At step 260, the enterprise resource service 114 can cause the secondary client device's 109 access to the enterprise resource 127 to be removed. For example, the enterprise resource service 114 can generate a command that, when executed by the secondary client device 109, would cause the sandboxed environment executing on the secondary client device 109 to restrict the user's ability to view, edit, or otherwise access the enterprise resource 127, within or without the sandboxed environment. As another example, the enterprise resource service 114 can instead notify the secondary client device 109 that it is no longer authorized to access the enterprise resource 127.

At step 261, the secondary client device 109 can restrict access to the enterprise resource 127. For example, the secondary client device 109 can prevent the user or any other application or process on the secondary client device 109 from accessing the enterprise resource 127 within (or without) the sandboxed environment. In some implementations, the secondary client device 109 can receive and execute a command from the enterprise resource service 114 that restricts access to the enterprise resource 127 within (or without) the sandboxed environment.

At step 263, the management service 121 can determine that the secondary client device 109 has once again become compliant with the one or more compliance rules 128. For example, the management service 121 determine that the secondary client device's 109 proximity to the primary client device 106a is again within the predefined threshold. As discussed above, the management service 121 can make this determination based on the proximity data continually provided by the primary client device 106a and the secondary client device 109 during P2P secure mode.

At step 266, the management service 121 can generate a new access token 130. This new access token 130 can allow the secondary client device's 109 to again access the enterprise resource 127. The management service 121 can then provide the new access token 130 to the authentication service 115.

At step 269, the authentication service 115 can request that the enterprise resource service 114 restore the secondary client device's 109 access to the enterprise resource 127. For example, the authentication service 115 can notify the enterprise resource service 114 that the secondary client device 109 has been issued a new access token 130 and/or is once again authorized to access the enterprise resource 127.

At step 272, the enterprise resource service 114 can restore the secondary client device's 109 access to the enterprise resource 127. For example, the enterprise resource service 114 can generate a command that, when executed by the secondary client device 109, would cause the sandboxed environment executing on the secondary client device 109 to again enable the user to view, edit, or otherwise access the enterprise resource 127 within the sandboxed environment. As another example, the enterprise resource service 114 can instead notify the secondary client device 109 that the secondary client device 109 is again authorized to access the enterprise resource 127.

At step 275, the secondary client device 109 can again access the enterprise resource 127. For example, the secondary client device 109 can re-enable the user to access the enterprise resource 127 within the sandboxed environment. In some implementations, the secondary client device 109 can receive and execute a command from the enterprise resource service 114 that re-enables access to the enterprise resource 127 within the sandboxed environment.

Figure 3:
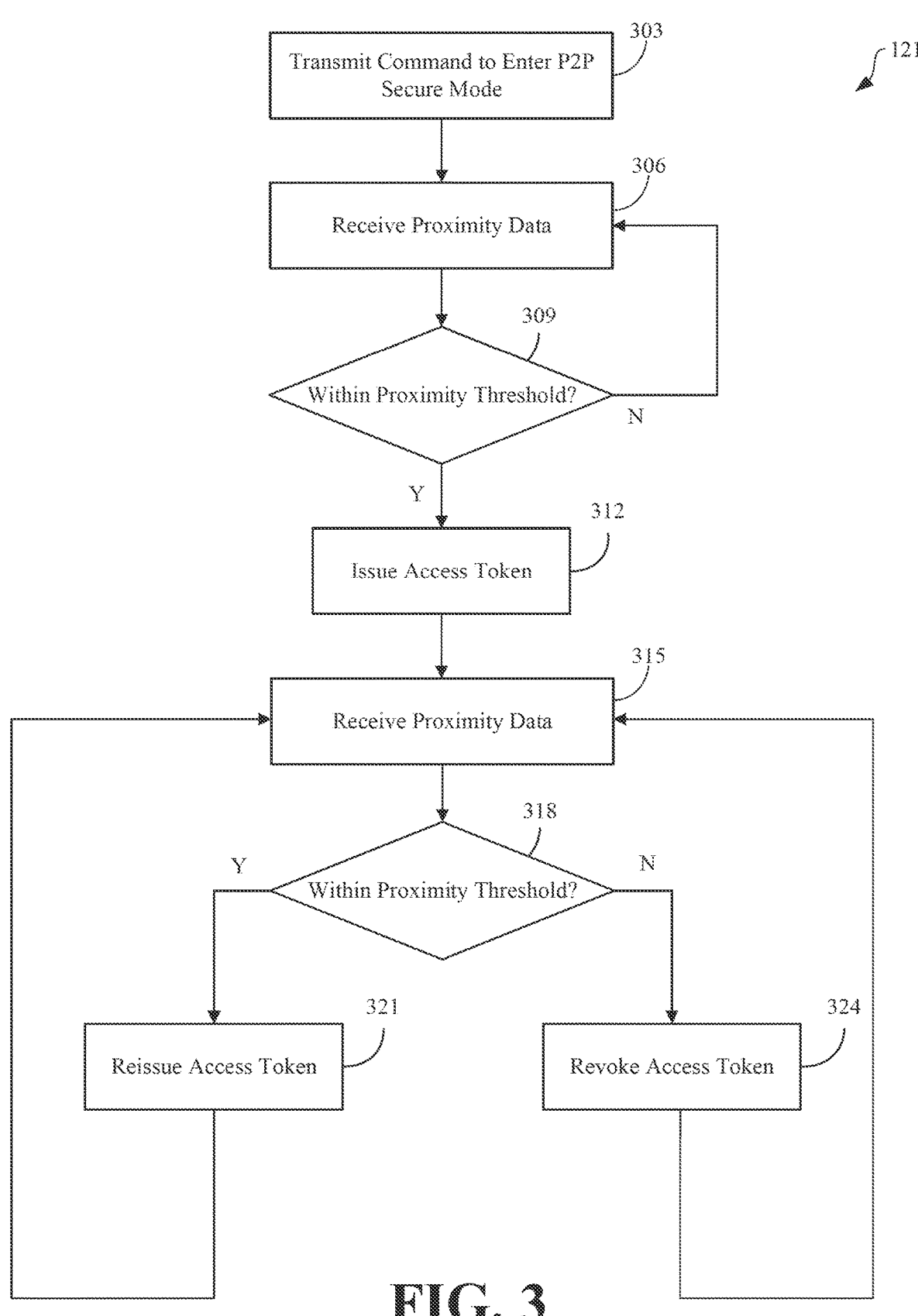
FIG. 3 shows a flowchart that provides an example of a portion of the operation of the networked environment, according to various embodiments of the present disclosure.

FIG. 3 shows a flowchart that provides an example of a portion of the operation of the management service 121.

While the actions of the steps of FIG. 3 can be described as performed by a particular device or component, other components of the networked environment 100 can also perform aspects of the steps and actions.

At step 303, the management service 121 can transmit a command to the primary client device 106a to enter P2P secure mode. During P2P secure mode, the primary client device 106a and the secondary client device 109 can communicate over a P2P channel between the two devices to gather data regarding a proximity of the secondary client device 109 to the primary client device 106a.

At step 306, the management service 121 can receive proximity data from the primary client device 106a and the secondary client device 109. The proximity data can indicate a proximity of the secondary client device 109 to the primary client device 106a. The primary client device 106a and the secondary client device 109 can each generate this proximity data based on, for example, nearby Wi-Fi networks, Bluetooth, Bluetooth Low Energy, near-field communication, sound detection, or other suitable methods.

At step 309, the management service 121 can determine whether the secondary client device 109 is within a predefined proximity threshold 129. The management service 121 can make this determination using the proximity data received at step 306. If the proximity data indicates that the proximity of the secondary client device 109 is within the predefined proximity threshold 129, then the secondary client device 109 may be compliant with the one or more compliance rules 128, and execution can proceed to step 309. If, however, the proximity data indicates that the proximity of the secondary client device 109 meets or exceeds the predefined proximity threshold 129, then the secondary client device 109 is non-compliant with the one or more compliance rules 128, and execution can proceed back to step 306.

At step 312, the management service 121 can issue the access token 130 to the secondary client device 109. The access token 130 can represent the secondary client device's 109 authorization to access to the enterprise resource 127. The access token 130 can include a character string, code, or other data. In some implementations, the access token 130 can be associated with a time limit such as 1 hour, 3 hours, 6 hours, 8 hours, or some other period of time. After expiration of the time limit, the access token 130 can no longer be used to prove the secondary client device's 109 authorization to access the enterprise resource 127. The management service 121 can provide the access token 130 to the authentication service 115.

At step 315, the management service 121 can continue to receive proximity data from the primary client device 106a and the secondary client device 109. The management service 121 can continually to receive proximity data from the primary client device 106a and the secondary client device 109 so long as the primary client device 106a remains in P2P secure mode.

At step 318, the management service 121 can again determine whether the secondary client device 109 is within the predefined proximity threshold 129. Because the management service 121 continually receives proximity data during P2P secure mode, the management service 121 can continually evaluate whether the secondary client device 109 is within the predefined proximity threshold 129. If the secondary client device 109 is within the predefined proximity threshold 129, execution can proceed to step 321. If the secondary client device 109 meets or exceeds the predefined proximity threshold 129, execution can proceed to step 324.

At step 321, the management service 121 can reissue an access token 130 to the secondary client device 109. The new the access token 130 can replace a previously revoked access token 130. This new the access token 130 can indicate to the authentication service 115 that the secondary client device 109 is again within the predefined proximity threshold 129 and should be permitted to access the enterprise resource 127. The management service 121 can notify the authentication service 115 that an access token 130 has been reissued. Execution can then proceed back to step 315, assuming that the secondary client device 109 is continuing to access the enterprise resource 127.

At step 324, the management service 121 can revoke the access token 130. The management service 121 can revoke the access token 130 in response to the secondary client device 109 meeting or exceeding the predefined proximity threshold 129 during P2P secure mode. Following revocation, the access token 130 is no longer valid to prove the secondary client device 109 is authorized to access the enterprise resource 127. The management service 121 can notify the authentication service 115 that the access token 130 has been revoked. Execution can then proceed back to step 315, assuming that the secondary client device 109 is continuing to access the enterprise resource 127.

Functionality attributed to the executable components discussed herein can be implemented in a single process or application or in multiple processes or applications. The separation or segmentation of functionality as discussed herein is presented for illustrative purposes only.

Flowcharts and sequence diagrams can show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts and sequence diagrams can show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The computing devices and other hardware components described herein can include at least one processing circuit. Such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the various executable software components can be stored in one or more storage devices and be executable by one or more processors. Also, a data store can be stored in the one or more storage devices.

The functionalities described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more of the components described herein that include software or program instructions can be embodied in any non-transitory computer-readable medium for use by or in connection with an instruction execution system such as a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in at least one computing device or by using multiple computing devices.

As used herein, "about," "approximately," and the like, when used in connection with a numerical variable, can generally refer to the value of the variable and to all values of the variable that are within the experimental error (e.g., within the 95% confidence interval for the mean) or within +/−10% of the indicated value, whichever is greater.

Where a range of values is provided, it is understood that each intervening value and intervening range of values, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

What is claimed is:

1. A system comprising:

at least one computing device comprising a processor and a memory, the at least one computing device being identified as a secondary client device by at least one server; and machine-readable instructions stored in the memory that, when executed by the processor, cause the computing device to at least:

request access to an enterprise resource stored in the at least one server;

establish a P2P communication channel between the secondary client device and a primary client device, which is identified by the at least one server as being an active client device nearest to the secondary client device;

determine a first proximity of the at least one computing device to the primary client device based on communication with the primary client device through the P2P communication channel;

generate first proximity data based at least in part on the first proximity of the at least one computing device to the primary client device;

continually provide the first proximity data to the at least one server, enabling the at least one server to determine whether the P2P communication channel is compliant with a predetermined rule based on the first proximity data and second proximity data that is generated by and continually provided from the primary client device based at least in part of a second proximity of the at least one computing device to the primary client device determined by the primary client device;

receive an authorization to access the enterprise resource based at least in part on the proximity data from the at least one server that determined that the P2P communication channel is compliant with the predetermined rule;

upon receiving the authorization to access the enterprise resource, cause a content viewing application that runs in the at least one computing device to generate a containerized sandbox environment and load the enterprise resource within the containerized sandbox environment, thereby enabling a user of the at least one computing device to view and edit the enterprise resource stored in the at least one server within the containerized sandbox environment;

receive a notification that the authorization to access the enterprise resource has been removed from the at least one server that has determined that the P2P communication channel has become non-compliant with the predetermined rule; and upon receiving the notification, cause the content viewing application to disable the user's ability to view and edit the enterprise resource stored in the at least one server within the containerized sandbox environment while the enterprise resource is still loaded within the containerized sandbox environment.

2. The system of claim 1, wherein the machine-readable instructions further cause the at least one computing device to at least:

receive a request to authenticate with an authentication service from the at least one server; and provide authentication credentials for the authentication service to the at least one server.

3. The system of claim 1, wherein the authorization to access the enterprise resource comprises a command to load the enterprise resource in the containerized sandboxed environment.

4. The system of claim 1, wherein the proximity of the at least one computing device to the primary client device is determined based at least in part on at least one of: at least one nearby IEEE 802.11 network, Bluetooth IEEE 802.15 network, Bluetooth Low Energy, near-field communication, or sound detection.

5. The system of claim 1, wherein the machine-readable instructions further cause the at least one computing device to at least receive a notification that the primary client device has entered a P2P secure mode, the P2P communication channel being established in response to the primary client device entering the P2P secure mode.

6. The system of claim 1, wherein the machine-readable instructions further cause the at least one computing device to at least:

receive a second notification that the authorization to access the enterprise resource has been restored from the at least one server that has determined that the P2P communication channel has once again become compliant with the predetermined rule; and upon receiving the second notification, cause the content viewing application to enable the user to view and edit the enterprise resource stored in the at least one server within the containerized sandbox environment while the enterprise resource is still loaded within the containerized sandbox environment.

7. A method, comprising:

requesting access to an enterprise resource stored in at least one server from a secondary client device;

establishing a P2P communication channel between the secondary client device and a primary client device, which is identified by the at least one server as being an active client device nearest to the secondary client device;

determining, by the secondary client device, a first proximity of the computing secondary client device to the primary client device based on communication with the primary client device through the P2P communication channel;

generating, by the secondary client device, first proximity data based at least in part on the first proximity of the computing secondary client device to the primary client device;

continually providing, from the secondary client device, the first proximity data to the at least one server;

determining, by the primary client device, a second proximity of the secondary client device to the primary client device;

generating, by the primary client device, second proximity data based at least in part on the second proximity of the secondary client device to the primary client device;

continually providing, from the primary client device, the second proximity data to the at least one server;

determining, by the at least one server, whether the P2P communication channel is compliant with a predetermined rule based on the first proximity data and the second proximity data;

receiving an authorization to access the enterprise resource based at least in part on the proximity data from the at least one server that determined that the P2P communication channel is compliant with the predetermined rule;

upon receiving the authorization to access the enterprise resource, causing a content viewing application that runs in the at least one computing device to generate a containerized sandbox environment and loading the enterprise resource within the containerized sandbox environment, thereby enabling a user of the at least one computing device to view and edit the enterprise resource stored in the at least one server within the containerized sandbox environment;

receiving a notification that the authorization to access the enterprise resource has been removed from the at least one server that has determined that the P2P communication channel has become non-compliant with the predetermined rule; and upon receiving the notification, causing the content viewing application to disable the user's ability to view and edit the enterprise resource stored in the at least one server within the containerized sandbox environment while the enterprise resource is still loaded within the containerized sandbox environment.

8. The method of claim 7, further comprising:

receiving a request to authenticate with an authentication service from the at least one server; and providing authentication credentials for the authentication service to the at least one server.

9. The method of claim 7, wherein the authorization to access the enterprise resource comprises a command to load the enterprise resource in the containerized sandboxed environment.

10. The method of claim 7, wherein the proximity of the computing secondary client device to the primary client device is determined based at least in part on at least one of: at least one nearby IEEE 802.11 network, Bluetooth IEEE 802.15 network, Bluetooth Low Energy, near-field communication, or sound detection.

11. The method of claim 7, further comprising receiving a notification that the primary client device has entered a P2P secure mode, the P2P communication channel being established in response to the primary client device entering the P2P secure mode.

12. The method of claim 7, further comprising:

receiving a second notification that the authorization to access the enterprise resource has been restored from the at least one server that has determined that the P2P communication channel has once again become compliant with the predetermined rule; and upon receiving the second notification, causing the content viewing application to enable the user to view and edit the enterprise resource stored in the at least one server within the containerized sandbox environment while the enterprise resource is still loaded within the containerized sandbox environment.

13. A non-transitory computer-readable medium embodying program instructions that, when executed, cause a computing device that is identified as a secondary client device by at least one server to at least:

request access to an enterprise resource stored in the at least one server;

establish a P2P communication channel between the secondary client device and a primary client device, which is identified by the at least one server as being an active client device nearest to the secondary client device;

determine a first proximity of the computing device to the client device based on communication with the primary client device through the P2P communication channel;

generate first proximity data based at least in part on the first proximity of the computing device to the primary client device;

continually provide the first proximity data to the at least one server, enabling the at least one server to determine whether the P2P communication channel is compliant with a predetermined rule based on the first proximity data and second proximity data that is generated by and continually provided from the primary client device based at least in part of a second proximity of the at least one computing device to the primary client device determined by the primary client device;

receive an authorization to access the enterprise resource based at least in part on the proximity data from the at least one server that determined that the P2P communication channel is compliant with the predetermined rule;

upon receiving the authorization to access the enterprise resource, cause a content viewing application that runs in the at least one computing device to generate a containerized sandbox environment and load the enterprise resource within the containerized sandbox environment, thereby enabling a user of the at least one computing device to view and edit the enterprise resource stored in the at least one server within the containerized sandbox environment;

receive a notification that the authorization to access the enterprise resource has been removed from the at least one server that has determined that the P2P communication channel has become non-compliant with the predetermined rule; and upon receiving the notification, cause the content viewing application to disable the user's ability to view and edit the enterprise resource stored in the at least one server within the containerized sandbox environment while the enterprise resource is still loaded within the containerized sandbox environment.

14. The non-transitory computer-readable medium of claim 13, wherein the machine-readable instructions further cause the computing device to at least:

receive a request to authenticate with an authentication service from the at least one server; and provide authentication credentials for the authentication service to the at least one server.

15. The non-transitory computer-readable medium of claim 13, wherein the proximity of the computing device to the primary client device is determined based at least in part on at least one of: at least one nearby IEEE 802.11 network, Bluetooth IEEE 802.15 network, Bluetooth Low Energy, near-field communication, or sound detection.

16. The non-transitory computer-readable medium of claim 13, wherein the machine-readable instructions further cause the computing device to at least receive a notification that the primary client device has entered a P2P secure mode, the P2P communication channel being established in response to the primary client device entering the P2P secure mode.

17. The non-transitory computer-readable medium of claim 13, wherein the machine-readable instructions further cause the computing device to at least:

receive a second notification that the authorization to access the enterprise resource has been restored from the at least one server that has determined that the P2P communication channel has once again become compliant with the predetermined rule; and upon receiving the second notification, cause the content viewing application to enable the user to view and edit the enterprise resource stored in the at least one server within the containerized sandbox environment while the enterprise resource is still loaded within the containerized sandbox environment.

* * * * *